United States Patent [19]
Melino

[11] Patent Number: 5,321,438
[45] Date of Patent: Jun. 14, 1994

[54] METHOD AND APPARATUS FOR COLOR PRINTING

[75] Inventor: Robert H. Melino, Webster, N.Y.

[73] Assignee: Xerox Corporation, Stamford, Conn.

[21] Appl. No.: 13,866

[22] Filed: Feb. 5, 1993

[51] Int. Cl.$^5$ ............... G03G 15/01; G01D 15/14
[52] U.S. Cl. .................................. 346/157; 346/160
[58] Field of Search ............................ 346/157, 160

[56] References Cited

U.S. PATENT DOCUMENTS

| | | | |
|---|---|---|---|
| 4,525,729 | 6/1985 | Agulnek et al. | 346/154 |
| 4,611,901 | 9/1986 | Kohyama et al. | 355/4 |
| 4,791,452 | 12/1988 | Kasai et al. | 355/140 |
| 4,833,503 | 5/1989 | Snelling | 355/259 |
| 5,025,272 | 6/1991 | Haneda et al. | 346/153.1 |

Primary Examiner—George H. Miller, Jr.

[57] ABSTRACT

A print bar color printing system wherein exposure occurs through previously deposited color toner is compensated for light absorption in the previously deposited toner by selectively increasing the output of the print bar during a pixel time interval. Each time interval is divided into sublines which are available for applying image data. One subline transmits image data corresponding to the color of the image to be exposed at the photoreceptor surface, while the second subline carries information as to previously exposed and developed color images which overlap the subsequent image. The print bar is then selectively addressed to form the main color image with a pulse of relatively long duration, or duty cycle, followed by a pulse having a relatively short duty cycle. The second or third pulses represent the additional exposure level needed to compensate for light absorbed by previous color toners formed on the belt during the earlier development process.

5 Claims, 4 Drawing Sheets

METHOD AND APPARATUS FOR COLOR PRINTING

BACKGROUND OF THE INVENTION AND MATERIAL DISCLOSURE STATEMENT

The present invention relates to plural, color image exposures formed on a photoreceptor belt by at least one LED print bar and, more particularly, to improvements in image exposure through previously exposed and developed images.

Image print bars used in xerographic recording systems are well known in the art. The print bar generally consists of a linear array of a plurality of discrete light emitting sources. Light emitting diode (LED) arrays are preferred for many recording applications. In order to achieve high resolution, a large number of light emitting diodes, or pixels, are arranged in a linear array on a common substrate. Each LED in the linear array is used to expose a corresponding area on a moving photoreceptor to an exposure value defined by the video data information applied to the drive circuits of the print bars. The photoreceptor is advanced in the process direction to provide a desired image by the formation of sequential scan lines.

Color digital LED printers may operate in either a single pass or multiple pass mode. In a single pass, process color system, three imagers are positioned adjacent to a moving photoreceptor surface and are selectively energized to create successive image exposures, one for each of the three process colors, cyan, magenta an yellow. A fourth black imager is usually added. A color digital printer may also operate in a highlight color mode wherein one or two colors and black are exposed. In a multiple pass system, each image area on the photoreceptor surface must make at least three revolutions (passes) relative to the transverse scan lines formed by the modulated beam generated by the imagers.

In one prior art embodiment of a single pass color xerographic printer shown in FIG. 1, a plurality of LED print bars are positioned adjacent to a photoreceptor belt surface and selectively energized to create successive image exposures. For full color, four bars are used, one for each of the three basic colors (cyan, magenta and yellow) and a fourth print bar for black images. FIG. 1 shows a color printing system having four exposure stations 10, 12, 14, 16, each station including an LED print bar 10A, 12A, 14A, 16A. Each print bar is selectively addressed by video image signals processed through Electronic Sub System (ESS) 15 and controlled by drive circuit 14 to produce a modulated output from each print bar which is coupled through a gradient index lens array 10B, 12B, 14B, 16B, onto the surface of previously charged photoreceptor belt 17. The length of belt 17 is designed to accept an integral number of full page image areas. Upstream of each exposure station are charge devices 18, 19, 20, 21, which place a predetermined electrical charge on the surface of belt 17. As the belt moves in the indicated direction, each image area moves past each of the print bars, with each bar providing an exposure pattern in response to the video data input. The exposure pattern begins when the leading edge of an image area reaches a transverse start-of-exposure line. The exposure pattern is formed of a plurality of closely spaced transverse scan lines. Downstream from each exposure station, a development system 26, 27, 28, 29, develops a latent image of the last exposure without disturbing previously developed images. A fully developed color image is then transferred at a transfer station 33 to an output sheet. Further details of xerographic stations in a multiple exposure single pass system are disclosed in U.S. Pat. Nos. 4,661,901; 4,791,452 and 4,833,503, whose contents are hereby incorporated by reference. It is understood that the image exposures formed by print bars 12A, 14A, 16A must be formed through toner deposited by developer stations 26, 27, 28.

A problem in prior art systems where sequential exposures are made through previously developed images is that some light energy is absorbed in exposing through previously applied toner material. Data in a color printer is applied in plates or color separations. Each color separation is imaged and developed in sequence and the second image station must image through areas of toner where the first image was developed. Thus, for example, if exposure station 10 in FIG. 1 formed a first color image (cyan) which was developed with a cyan toner at development station 26, portions of the exposure of the second (magenta) image at exposure station 12 which overlap the cyan image, would have to be made through the previously laid down magenta toner. Continuing, a third color image (yellow) printed at station 14 would have to be made through the cyan and magenta toner, to the extent that portions of the yellow image would overlap the previously formed cyan and magenta images. Since the prior art binary print bars can only write a line of data with the on pixels at one exposure, successive exposures would have more light from the print bar absorbed by the previous toner images, reducing the amount of light penetrating to the recharged surface of the photoreceptor and hence reducing the efficiency and faithfulness of the color rendition. According to a first aspect of the invention, circuitry is provided for the second and subsequent exposure stations which would generate signals to the print bars of the second and subsequent print bars to increase exposure to these print bars so as to compensate for the absorption of light due to the previous exposure(s). Thus, in a modification to the FIG. 1 embodiment, color plate information input to print bar 10A would also applied to print bar 12A and 14A in such a way as to increase the output energy needed to efficiency image through the previously applied toner. More particularly, the present invention relates to a color printer for forming successive color latent images on the surface of a photoreceptor belt, moving in a process direction, each latent image subsequently developed with a color toner with successive image exposures accomplished in superimposed registration with previously developed color images, the printer including:

means for charging the photoreceptor belt surface, print bar means for producing a plurality of exposure patterns on the belt in accordance with binary image data signals representing a plurality of colors, said exposure patterns formed by addressing selective pixels in said print bar means during a pixel time interval defining a color image line, means for developing each exposure pattern with a color toner, means for recharging each developed image, said print bar means being successively addressed to form subsequent color exposure patterns by exposing the recharged photoreceptor through said previously developed color toner, and image data processing circuit means for recognizing that at least a portion of a subsequent color exposure pattern is to be formed through a previously developed color toner and including means for increasing exposure in at least said portion.

DESCRIPTION OF THE INVENTION

Figure 1:
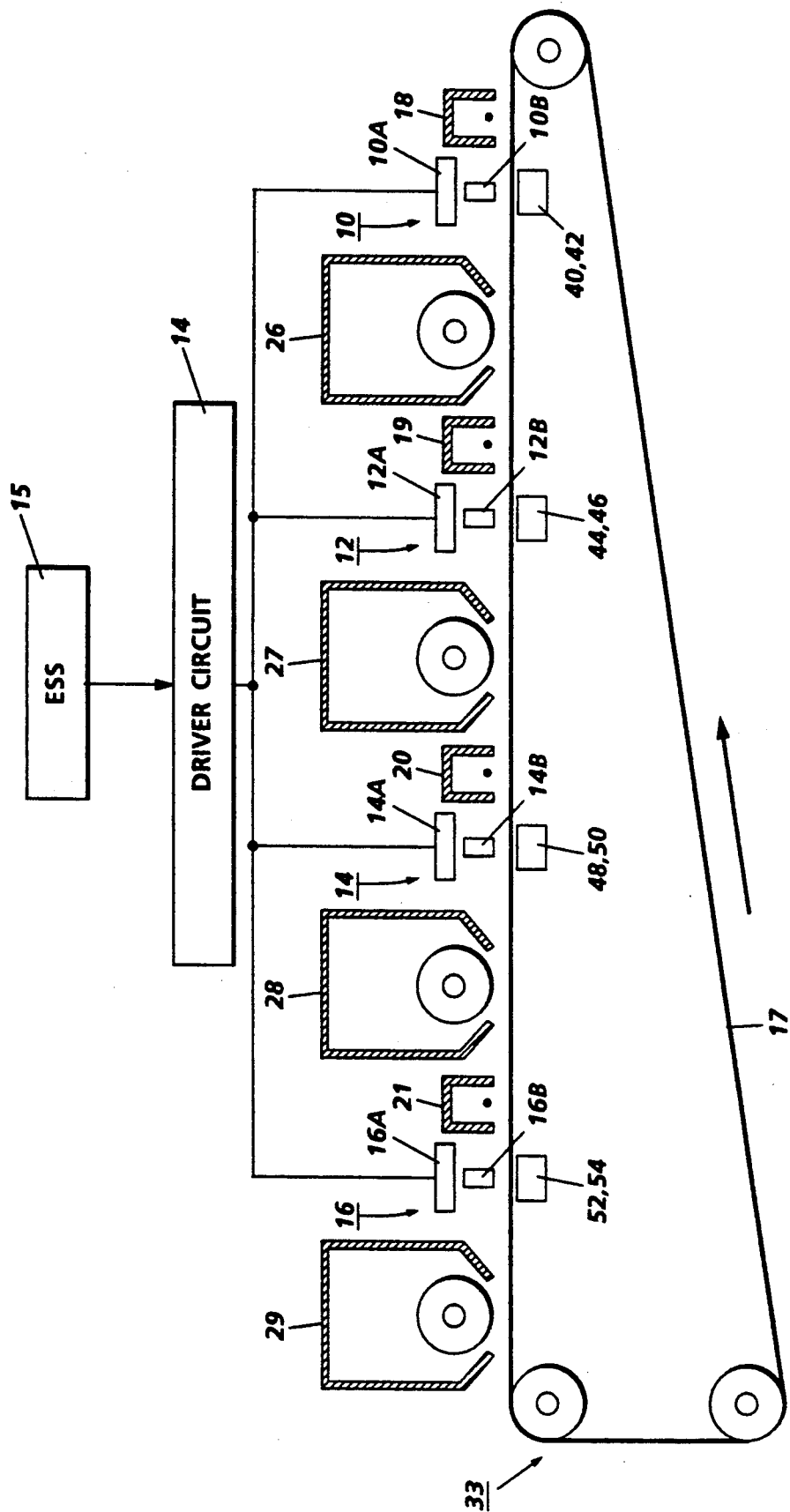
FIG. 1 is a side view of a prior art single pass LED image bar color printer.
Figure 2:
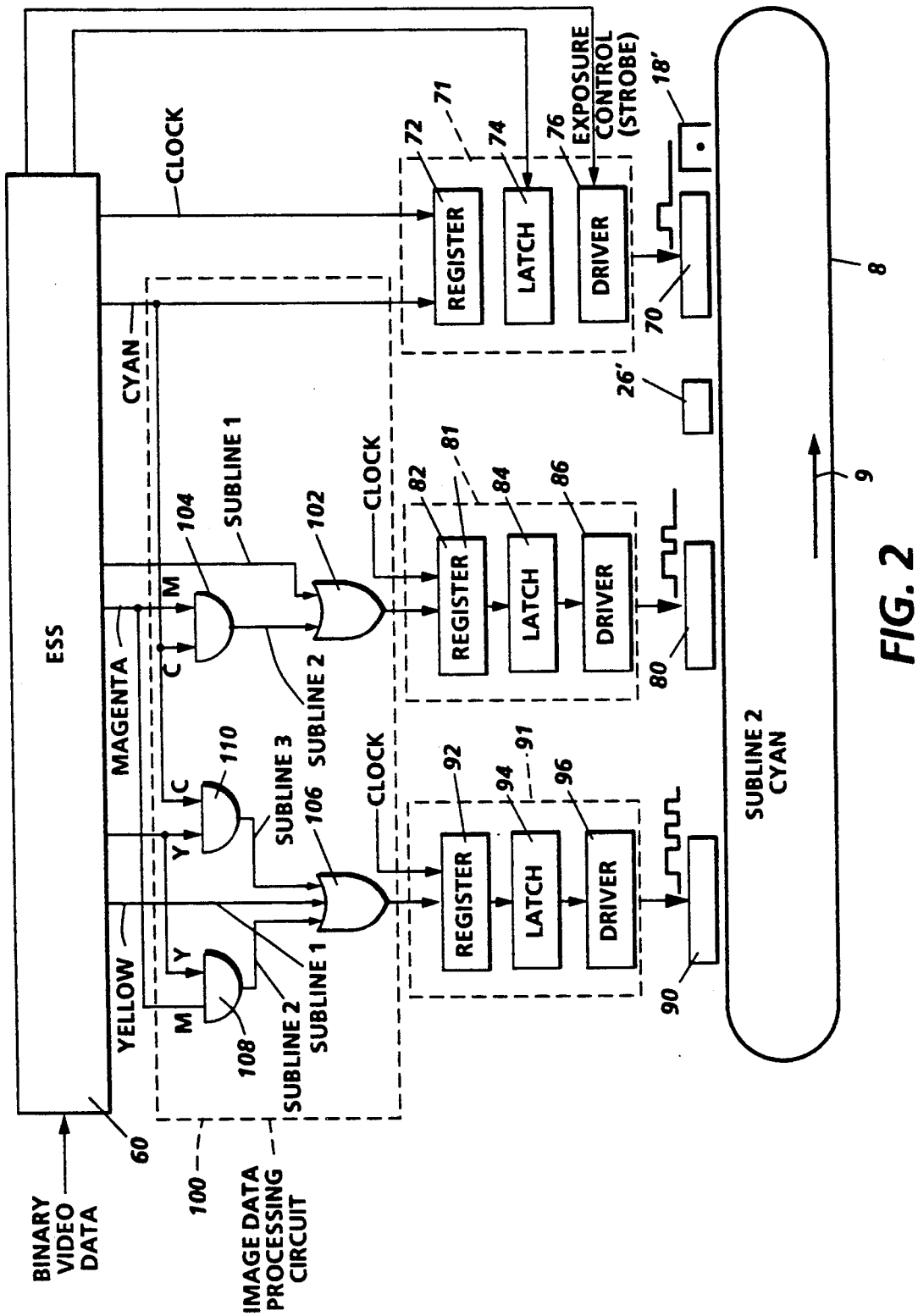
FIG. 2 shows the FIG. 1 embodiment modified by the addition of control circuitry to selectively increase image bar exposure through previous toner images according to the invention.

Referring now to FIG. 2, an improved LED color printer, a modified version of the FIG. 1 system, is shown which provides circuitry for compensating for loss of color exposure through previously developed color images. Binary video data signals are applied to ESS controller 60, controller 60 containing the logic and storage elements for controlling energization of LED print bars 70, 80 and 90 via drive circuits 71, 81, 91, respectively. Incorporated within controller 60 are the clock circuits and exposure control circuits which provides output signals to circuits 71, 81, 91 to control the instantaneous shift of data bits to drive the LEDs of each of the print bars while also operating to recognize the binary format of the binary data signal input. The drive circuit 71, for illustrative purposes, incorporates shift register 72, latch register 74 and driver 76. Circuits 81 and 91 include similar circuits. Binary video data signals representing a cyan image are read into shift register 72 and the signal is shifted through the register, under control of the clock signals from the ESS. Upon receipt of the last binary bit to be entered, the data bits are shifted in parallel into latch register 74 where they are temporarily stored. These signals are shifted out, again in parallel, to driver circuit 76 upon receipt of a latch signal generated by detection of an end of line condition. The driver circuit receives the relevant data bit signals from the latch register during each line period; however, these signals cannot be released to the respective LEDs comprising print bar 70 until the drivers are activated by an exposure control or strobe signal generated by the ESS. The drive circuit comprises a plurality of drive transistors, each transistor associated with an individual LED. It is understood that drive circuits 81 and 91 have similar latch register and driver circuits. As will be seen, the invention is directed towards additional circuitry in image data processing circuit 100 which receives information from the previous color images and generates pulses representing compensating energy to the respective image bars during a single line time as will be seen.

Figure 3A:
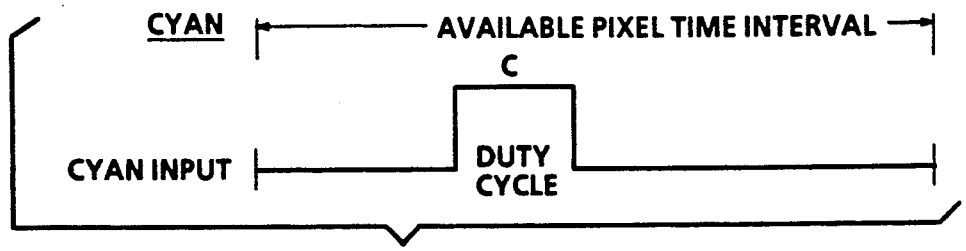
FIGS. 3A, 3B and 3C shows the addressing of the print bars of FIG. 2 during a pixel time interval.

For purposes of better understanding the invention, an operational mode will be described. Referring to FIG. 2, photoreceptor belt 8 moves in a process direction represented by arrow 9. LED print bars 70, 80, 90 are oriented in a direction transverse to the process direction. An exemplary print bar would comprise approximately 2550 LEDs (pixels) aligned in a row to provide a line exposure of 8.5 inches. A charging station 18' charges belt 8 to a fully charged voltage. Belt 8 moves past print bar 70. A first cyan binary bit map image signal is applied from ESS 60 to register 72 of drive circuit 71. The signal is shifted through register 72 under control of the clock signal into latch register 74 and then to driver 76. The individual circuit driver is activated by an exposure control strobe signal energizing selected ones of the light emitting diodes comprising print bar 70 for a time duration which is defined as a duty cycle. This duty cycle occurs during an available pixel time interval which defines a full scanned line. Referring to FIG. 3A, it is seen that each energized LED is illuminated at a constant intensity and an exposure value for each pixel is determined by the duty cycle. The duty cycle is usually from 0 to 50% of the available pixel time interval. It is understood that the light output from bar 70 is transmitted through a gradient index lens array which has not been shown for purposes of ease of description.

Continuing with the operation mode described, belt 8 is imagewise discharged by light from selectively engaged pixels according to the cyan image data. This line-by-line imagewise discharge of belt 10 leaves an electrostatic latent image on the belt which is subsequently developed by developer 26'. The developed cyan image is recharged by a second charging station, not shown, but similar to station 18', and the belt moves the developed and recharged image past print bar 80. Print bar 80 and, as will be seen, print bar 90 are addressed, according to the invention, by several pulses generated during the available pixel time interval. The pixel time interval defining the full scanned line time is divided into two or more sublines, one subline used to transmit the main color information image signals, while a second or third subline transmits information relating to previously developed color images. The sublines correspond to a distance moved by belt 8, relative to light emission during a duty cycle. Preferably, a duty cycle of a subline generated pulse is short compared to the pixel time interval. Typical pixel time intervals are 1/300 of an inch. Short duty cycles are practical, since only small pulse durations are required, assuming an efficient match between the light emitting diode and the photoreceptor. As an example, an efficient combination of print bar and photoreceptor includes a light emitting diode producing radiation having a wavelength 720 nm and a corresponding photoreceptor designed for maximum discharge when irradiated with a light having a wavelength of 720 nm. An exemplary print bar would comprise approximately 2550 LEDs (pixels) aligned in a row to provide a line exposure of 8.5 inches.

To recapitulate, the total combined exposure of image bar 80 within each pixel time interval is composed of two components; the magenta image forming pulses having a relatively large duty cycle and a second pulse with a shorter duty cycle to compensate for exposing through the previously applied cyan toner. Each succeeding line of the magenta image is exposed in the same fashion to form the complete compensated magenta latent image.

Figure 3B:
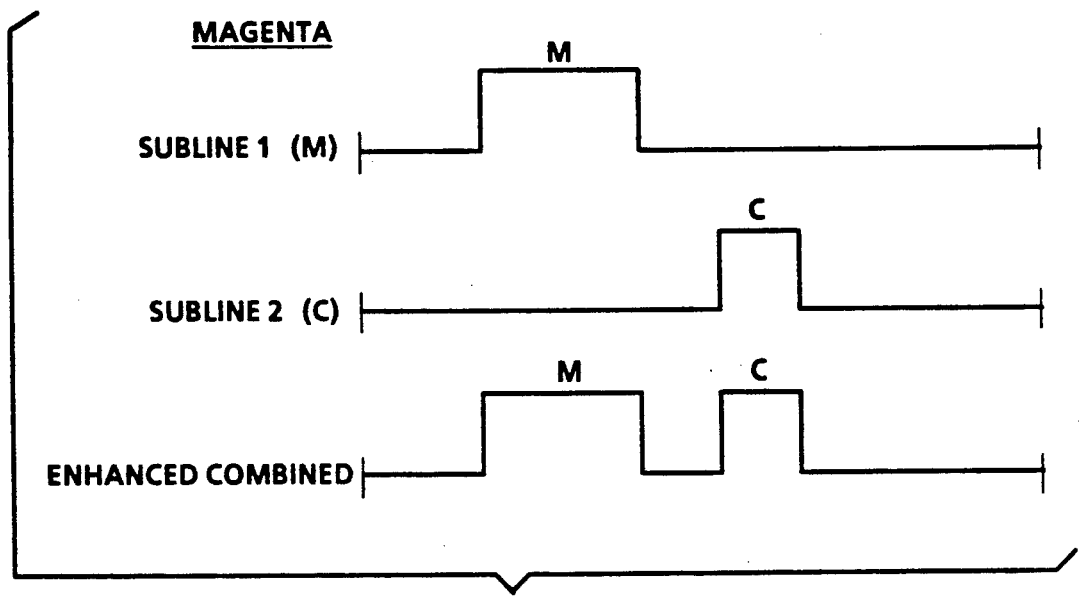

Continuing with the description, as the belt advances, the magenta latent image is developed by a magenta developer station and the developed image is recharged by a third charging station. The development and recharge stations are not shown to simplify the drawings, but their operation is conventional as described in the prior art and the FIG. 1 embodiment. Referring again to FIGS. 2 and 3, the belt advances beneath print bar 80. A magenta image is accomplished by pulsing print bar 80 twice during the pixel time interval by bit map image signals generated along a first and second subline. The magenta bit map image data signal is transmitted to drive circuit 81 along a subline 1 via OR gate 102 in image data processing circuit 100. The line input is processed as described for the cyan image and, under control of the exposure strobe signal, energizes the LEDs of print bar 80 to provide the modulated line output corresponding to the magenta line image data. A second signal is generated along subline 2 by applying the magenta bit map signal and the cyan bit map signal to AND gate 104. The output of AND gate 104 is a bit map signal representing an image where a magenta image is to be formed and where cyan toner has been previously laid down; e.g. the signal on subline 2 is a cyan compensation signal. Thus, the cyan compensation signal represents the additional energy to be applied to print bar 80 to compensate for exposure through the cyan toner. The cyan compensation signal is transmitted through OR gate 102 at a time subsequent to the transmission of the magenta image signal on subline 1, but during the same pixel time interval. The cyan compensation signal is applied to print bar 80 under control of the exposure strobe signal. The strobe is applied so as to energize the selected LEDs of the print bar with a pulse having a duty cycle of from 0 to 25% of the total pixel time interval, as shown in FIG. 3B.

Figure 3C:
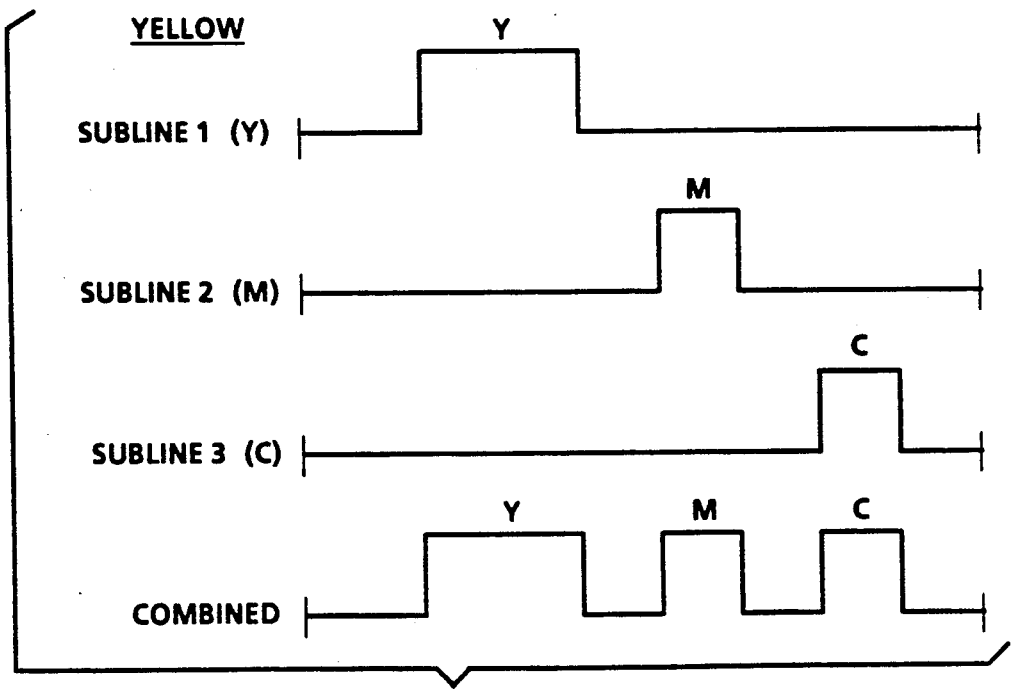

A yellow image is accomplished by pulsing print bar 90 three times during a pixel time interval by bit map image signals generated along a first, second and third subline. The yellow bit map image is transmitted to drive circuit 91 along a subline 1, via OR gate 106. The line input is processed as described previously for the cyan and magenta images and, under control of the exposure strobe signal, energizes the LEDs of print bar 90 to provide the modulated line output corresponding to the yellow line image data. A second signal is generated along subline 2 by applying the magenta bit map signal and the yellow bit map signal to AND gate 108. The output of AND gate 108 is a bit map signal representing an image where a yellow image is to be formed and where magenta toner has been previously laid down, e.g. the signal on subline 2 is a magenta compensation signal. Thus, the magenta compensation signal represents the additional energy to be applied to print bar 90 to compensate for the exposure through magenta toner. The magenta compensation signal on subline 2 is transmitted through OR gate 106 at a time subsequent to the transmission of the yellow image signal on subline 1 but during the same pixel time interval. The magenta compensation signal is applied to print bar 90 under control of the exposure strobe signal. The strobe is applied so as to energize the selected LEDs of the print bar with pulses having a duty cycle of about 0 to 25% of the total pixel time as shown in FIG. 3C. A third signal is generated along subline 3 by applying the yellow bit map signal and the cyan bit map signal to AND gate 110. The output of AND gate 110 is a bit map signal representing an image where a yellow image is to be formed and where cyan toner has been previously laid down, e.g. the signal on subline 3 is a cyan compensation signal. The cyan compensation signal represented the additional energy to be applied to print bar 90 to compensate for exposure through the cyan toner. The cyan compensation signal is transmitted through OR gate 106 at a time subsequent to the transmission of the yellow image signal on subline 1 and the magenta compensation signal on subline 2 but during the same pixel time interval. The cyan compensation signal is applied to print bar 90 under control of the exposure strobe signal. The strobe signal is applied so as to energize selected LEDs of print bar 90 with pulses having a duty cycle of from 0 to 25% of the total pixel time interval and as shown in FIG. 3C. It is understood that three strobe pulses are generated for each line, one line at a time.

Continuing with the description, belt 8 is moved through another development station (not shown) where the yellow image is developed. The complete color image is then transferred to a copy sheet and fused by conventional means. Alternatively, the belt can advance into a fourth black exposure station. It is understood that the invention can be practiced with other colors and in a different exposure development order.

Figure 4:
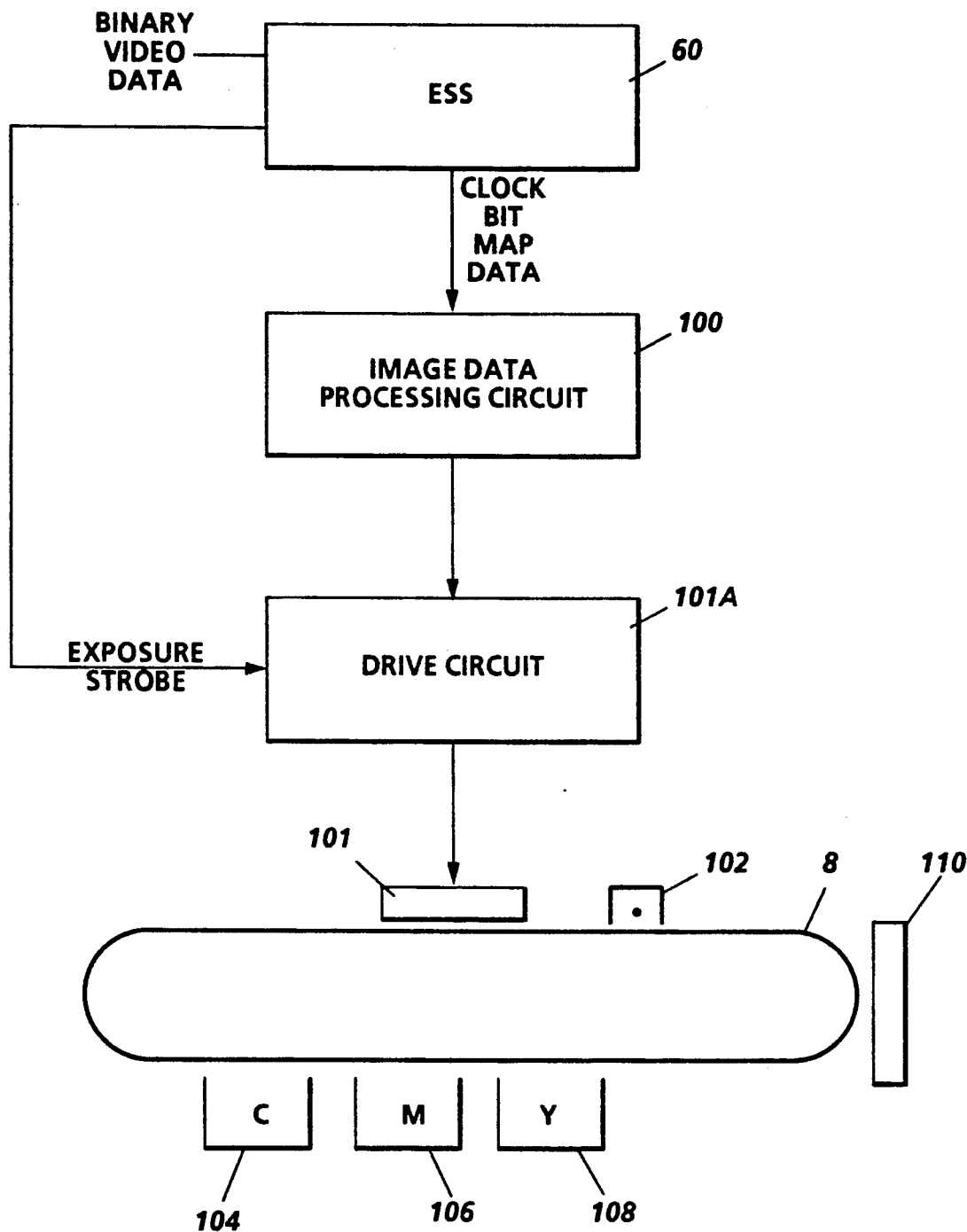
FIG. 4 is a second embodiment of the invention as operated in a multi-pass color printing system.

While the invention was described in the context of a single pass system, the invention can also be practiced in a multiple pass printing environment. As shown in FIG. 4, belt 8 is exposed at a single exposure station by print bar 101. Belt 8 is charged at charging station 102. Latent images formed by print bar 101 are developed at developer stations 104, 106, 108. Complete color images are transferred to a copy sheet at transfer station 110. Xerographic stations in the multi-pass system would operate in the same way as the single pass system, but with more relaxed time constraints. The system shown in FIG. 4 would have the same problem as the single pass system of FIG. 2; that is, if the first image exposure (cyan) is developed and recharged, the second (magenta) exposure must be made through the syan image. Similarly, the yellow exposure must be made through the magenta and cyan toner. As for the single pass embodiment, ESS 60 processes the binary video data input and sends color image bit map signals to image processing data circuit 100. Circuit 100 controls the generation of the magenta and cyan compensation signals and applies the signals to drive circuit 101A. Restating, for the cyan exposure, print bar 101 is addressed by the binary signal image data and the cyan latent image is formed on the belt surface, developed at developer 102 and recharged at station 102. The magenta exposure is accomplished line by line by providing signals generated along a first and second subline in circuit 100, to print bar 101 during the same pixel time interval. The first signal represents the magenta image. The second signal represents areas where previous syan images where formed and provides the additional exposure needed for the magenta image to be exposed through the previously deposited cyan image. The magenta image is developed at developer 106, recharged at 102 and exposed by signals generated along sublines 1, 2 and 3 in circuit 100. Subline 1 signal is a yellow image which produces a first exposure of the yellow image at the photoreceptor. Subline 2 signal is the magenta compensation signal. Subline 3 carries a cyan compensation signal. The yellow latent image is then developed at developer station 108 and the image transferred at station 110.

The process of the present invention is also suitable for multiple bit per pixel gray level printing. Gray level printing systems are disclosed, for example, in U.S. Pat. No. 4,525,729 and co-pending U.S. Application, Ser. No. 07/898,604, both of which are incorporated by reference. By adding in the proper number of gray sublines for the extra exposure required for previously developed areas, gray printing can also be compensated for.

While the invention has been described with reference to the structures disclosed, it is not confined to the details set forth, but is intended to cover such modifications or changes as they come within the scope of the following claims. For example, a black print bar was not disclosed in FIG. 2 or FIG. 4, but a black station could be used as in the conventional prior art.

What is claimed is:

1. A color printer for forming successive color latent images on the surface of a photoreceptor belt, moving in a process direction, each latent images subsequently developed with a color toner with successive image exposures accomplished in superimposed registration with previously developed color images, the printer including:
    means for changing the photoreceptor belt surface,
    print bar means for producing a plurality of exposure patterns on the belt in accordance with binary image data signals representing a plurality of colors, said exposure patterns formed by addressing selective pixels in said print bar means during a pixel time interval defining a color image line,
    means for developing each exposure pattern with a color toner,
    means for recharging each developed image, said print bar means being successively addressed to form subsequent color exposure patterns by exposing the recharged photoreceptor through said previously developed color toner, and
    image data processing circuit means for recognizing that at least a portion of a subsequent color exposure pattern is to be formed through a previously developed color toner and including means for increasing exposure in at least said portion, said image data processing circuit means including means for addressing said print bar means during each said pixel time interval with at least a second data signal representing the first image data signal whereby said print bar means produces a light output which is compensated for the exposure absorbed by passage of light through the previously deposited color toner.

2. The printer of claim 1 wherein said print bar means includes a plurality of print bars to produce said plurality of exposure patterns in a single pass of the photoreceptor belt.

3. The printer of claim 2 wherein said pixel time interval is divided into a plurality of sublines and wherein a first print bar is addressed during a first pixel time interval to create a first color exposure which is subsequently developed and recharged and at least a second print bar which is addressed by a first signal generated along a first subline representing a second color image and by a second signal representing compensating energy required to image said second color through the toner of the previous color image.

4. The printer of claim 1 wherein said print bar means includes a single print bar to produce said plurality of exposure patterns during multiple passes or revolutions of the photoreceptor belt.

5. The printer of claim 1 wherein said previous color exposure is gray.

* * * * *